United States Patent [19]

Dyer et al.

[11] Patent Number: 5,401,283
[45] Date of Patent: Mar. 28, 1995

[54] ULTRA-HARD ABRASIVE PARTICLES

[76] Inventors: Henry B. Dyer, 28 George Street, Bryanston Sandton, Transvaal; Geoffrey J. Davies, 36 Boundary Road, Linden Ext., Randburg, Transvaal; Robert C. Burns, 15 Los Angeles Drive, Northcliff, Transvaal, all of South Africa

[21] Appl. No.: 136,493

[22] Filed: Oct. 14, 1993

Related U.S. Application Data

[63] Continuation of Ser. No. 959,069, Oct. 9, 1992, abandoned.

[30] Foreign Application Priority Data

Oct. 14, 1991 [ZA] South Africa ............. 91/8165

[51] Int. Cl.$^6$ ............................................. B24D 3/00
[52] U.S. Cl. .......................... 51/293; 51/307; 106/286.8; 428/403; 428/408
[58] Field of Search ............. 51/293, 309, 307; 156/218, 68, 70; 106/286.8; 428/403, 408

[56] References Cited

U.S. PATENT DOCUMENTS

| | | | |
|---|---|---|---|
| 3,779,726 | 12/1973 | Fisk et al. | 51/309 |
| 4,062,660 | 12/1977 | Nicholas et al. | 51/309 |
| 4,188,194 | 2/1980 | Corrigan | 51/309 |
| 4,246,006 | 1/1981 | Phaal | 51/309 |
| 4,610,699 | 9/1986 | Yazu et al. | 51/293 |
| 4,750,914 | 6/1988 | Chikaoka et al. | 51/293 |
| 4,964,209 | 10/1990 | Murai et al. | 51/309 |
| 5,173,089 | 12/1992 | Tanabe et al. | 51/293 |

FOREIGN PATENT DOCUMENTS

| | | | |
|---|---|---|---|
| 4038190 | 6/1991 | Germany . | |
| 50-061413 | 5/1975 | Japan | C04B 35/58 |
| 1039397 | 11/1988 | U.S.S.R. . | |

OTHER PUBLICATIONS

J. Phys. D. Appl. Phys., vol. 20, 909–974 (1987) Collins, A. T. et al, "Nitrogen isotope effects in synthetic diamonds".
Database Inspec. No. 803670 Abstract (May 1975).
JETP Letters, vol. 14, (1971), pp. 551–553, Samoilovitch et al, "Electron Paramagnetic Resonance of Nickel in Synthetic Diamond".

*Primary Examiner*—Mark L. Bell
*Assistant Examiner*—Deborah Jones
*Attorney, Agent, or Firm*—Michael N. Meller

[57] ABSTRACT

A synthetic diamond or cubic boron nitride particle is characterized by containing two or more stable isotopes of an element present in a ratio which is different to the ratio in which the isotopes exist in nature. The diamond or cubic boron nitride particle thus has a fingerprint. A preferred example of the element is nitrogen.

12 Claims, No Drawings

ULTRA-HARD ABRASIVE PARTICLES

This application is a continuation of application Ser. No. 959,069, filed Oct. 29, 1992, now abandoned.

BACKGROUND OF THE INVENTION

This invention relates to ultra-hard abrasive particles.

Diamond and cubic boron nitride particles are synthesised commercially in large quantities in a variety of countries around the world. The synthesis involves providing a source material, typically graphite in the case of diamond, and hexagonal boron nitride in the case of cubic boron nitride, which is mixed with a solvent/catalyst and then subjecting this mixture to elevated temperature and pressure conditions at which the particular particle being produced is crystallographically stable.

It is possible to influence the growth and physical characteristics of synthesised particles by varying one or more of a number of factors. For example, factors which can be varied are the temperature and pressure of the system, the configuration of the reaction capsule, the impurity profile of the source material and the mechanical and physical characteristics of the solvent/catalyst and source material. In this way, particles can be tailored to meet specific requirements.

SUMMARY OF THE INVENTION

According to the present invention, a synthetic ultra-hard abrasive particle selected from diamond and cubic boron nitride is characterised by containing two or more stable isotopes of an element present in a ratio which is different to the ratio in which the isotopes exist in nature. The presence of this unique isotope ratio in the particle provides that particle with a fingerprint for identification purposes.

Further according to the invention, a method of producing ultra-hard abrasive particles as described above includes the steps of providing a reaction vessel containing a reaction mass comprising source material and a catalyst/solvent for the abrasive particle and subjecting the reaction mass to conditions of elevated temperature and pressure at which the abrasive particle is crystallographically stable in the presence of two or more stable isotopes of an element present in a ratio which is different to the ratio in which the isotopes exist in nature.

DESCRIPTION OF EMBODIMENTS

The ultra-hard abrasive particles will be diamond or cubic boron nitride. These particles may be synthesised by methods knob in the art. In such synthesis, the fingerprinting isotopes will be provided in a form and under conditions which enable them to be included in the particle synthesised.

The synthesis of diamond and cubic boron nitride particles is well known in the art and described extensively in the patent literature. The synthesis broadly involves subjecting a source material and a catalyst/solvent for the abrasive particle to conditions of elevated temperature and pressure at which the abrasive particle is crystallographically stable. Source material for diamond may be a carbon material such as amorphous carbon or graphite, while source material for cubic boron nitride is generally hexagonal boron nitride. A wide variety of catalyst/solvents may be used. By way of example, catalyst/solvents for diamond are transition metals such as nickel, cobalt and iron, while for cubic boron nitride examples of suitable catalysts/solvents are alkali and alkaline metal nitrides and boronitrides. The conditions of elevated temperature and pressure which are applied will typically be temperatures of the order of 1400° to 1600° C. and pressures of the order of 40 to 70 kilobars. These conditions apply to both diamond and cubic boron nitride synthesis.

The reaction mass for the synthesis will be placed in a reaction vessel. The vessel is generally a cup in which the reaction mass is placed and a co-operating top part or lid which closes the cup. The material of the cup will generally be a refractory metal such as tantalum. This loaded reaction vessel is then placed in the reaction zone of a conventional high temperature/high pressure apparatus for the synthesis.

In one form of the invention, the isotopes chosen may be nitrogen 14 and nitrogen 15, the ratio between the two isotopes being different to that which exists in nature. Such isotopes may be included in a synthesised ultra-hard abrasive particle in any one of the following methods:

1. Nitrogen gas may be introduced into the reaction vessel prior to synthesis thereby resulting in doping of the synthesised particle. The nitrogen gas will be so chosen that it will be enriched with nitrogen 15 such enrichment being to a degree greater than, generally measurably greater than, natural abundance.
2. A suitable nitrogen-containing compound containing a desired N14/N15 ratio may be included e.g. by mixing in the reaction mass. Examples of suitable inorganic nitrogen compounds are iron nitride, lithium nitride and calcium nitride. The latter two are particularly suitable for CBN synthesis. Examples of suitable organic nitrogen compounds are hexamethylene tetramine, urea, piperazine and 1,2,4-triazole.
3. The catalyst/solvent used in the synthesis may be nitrided using a nitrogen 15 enriched nitriding gas such as ammonia. For example, iron may be treated with nitrogen 15 enriched ammonia and hydrogen at a temperature of about 500° C.

Method 1 is suitable for diamond particles only, while methods 2 and 3 are suitable for both diamond and cubic boron nitride.

The particles so synthesised will have the desired N14/N15 ratio which may be detected using techniques such as electron spin resonance (ESR) optical absorption, luminescence and mass spectrometry.

In another form of the invention, the element is a solvent/catalyst element which has more than one stable isotope. The element may be included in the catalyst/solvent used in the synthesis or it may constitute the entire catalyst/solvent used in the synthesis. By way of example, nickel has 5 stable isotopes of natural abundance as specified below, and iron has 4 such stable isotopes. These isotopes will be taken up in measurable amounts into the diamond as impurities.

| Ni 58 | 68,27% | Fe 54 | 5,82% |
| Ni 60 | 26,10% | Fe 56 | 91,8% |
| Ni 61 | 1,13% | Fe 57 | 2,1% |
| Ni 62 | 3,59% | Fe 58 | 0,28% |
| Ni 64 | 0,91% | | |

Alternatively the catalyst/solvent may be doped with the fingerprinting element, the naturally occurring stable isotope ratio of which has been modified or altered. Examples of such elements are boron, chromium, silicon, vanadium, magnesium, calcium, titanium and the rare earth metals. In the case of boron, the element will take up a substitutional position in the diamond lattice.

For the nickel and boron isotopes, the detection technique may be optical absorption using optically active lattice impurities with associated single atoms of nickel or boron, or mass spectrometry. In the case of iron and other elements, mass spectrometry may be used as the detection technique.

An example of the invention will now be described wherein nitrogen having an N14/N15 ratio different to that which exists in nature, is introduced into synthetic diamond particles. The characteristic yellow color of synthetic diamond products is largely due to the incorporation of a 150 to 350 parts per million nitrogen impurity in the diamonds during manufacture. The sources of nitrogen impurity are nitrogen in the solvent metal, nitrogen chemically tied up with the graphite source material and nitrogen gas trapped in the porosity present in the reaction vessel.

The stable isotopes of nitrogen are N14 and N15. The natural abundance of N15 is 0,37%, the remaining N14 being 99,63%. Thus, diamond produced synthetically will typically have an N15 content of 0,37%.

By far the largest component of nitrogen impurity in synthetic diamonds takes the form of singly substituted atoms in the diamond lattice. By virtue of the unpaired electron on these single nitrogen atoms, they may be detected using electron spin resonance (ESR). The N15 isotope ESR line force is at a different magnetic field strength than that of N14 and can thus be distinguished.

N15 enriched diamond particles were produced in the following manner. A mixture of graphite and cobalt catalyst/solvent was placed in a reaction vessel which was sealed. After sealing, a puncture hole was formed in the side of the vessel, evacuation took place, and the punctured vessel was placed in a one atmosphere pressure nitrogen gas environment. The nitrogen gas was 20% enriched with nitrogen 15. The capsule was then re-sealed by filling the puncture holes with small spots of solder.

The sealed reaction vessel was placed in the reaction zone of a conventional high temperature/high pressure apparatus and subjected to a temperature of 1500° C. and a pressure of 60 kilobars. These conditions of elevated temperature and pressure were maintained for a period of 10 to 15 minutes. The diamond was recovered from the reaction vessel using known and conventional techniques.

Nitrogen 15 was detected in the diamond particles using ESR. Such detection was more readily achieved in those diamond particles having a low metal content. In such particles the N15 was measured to be about 2% which is about an order of magnitude greater than the natural abundance.

We claim:

1. A method of producing a synthetic ultra-hard abrasive particle selected from diamond and cubic boron nitride, said abrasive particle containing two or more stable isotopes of an element, said isotopes present in a ratio which is different than the ratio in which the isotopes exist in nature, said method comprising the steps of
   a) providing a reaction vessel containing a reaction mass comprising a source material, a catalyst/solvent for the abrasive particle and an element containing two or more stable isotopes present in a ratio different than that which exists in nature; and
   b) subjecting the reaction mass to conditions of elevated temperature and pressure at which the abrasive particle is crystallographically stable in the presence of the isotopes.

2. A method according to claim 1, wherein the abrasive particle is diamond and the element is nitrogen, and wherein nitrogen gas containing an $^{14}N/^{15}N$ ratio different to that which exists in nature is introduced into the reaction vessel prior to the conditions of elevated temperature and pressure being applied to the reaction mass.

3. A method according to claim 1, wherein the element is nitrogen and is included in the catalyst/solvent by nitriding the catalyst/solvent using an $^{15}N$ enriched nitriding gas.

4. A method according to claim 1, wherein the element is a solvent/catalyst element and the isotopes are included in the catalyst/solvent of the reaction mass.

5. A method according to claim 4, wherein the abrasive particle is diamond and the element is nickel.

6. A method according to claim 5, wherein the isotopes of nickel are selected from $^{58}Ni$, $^{60}Ni$, $^{61}Ni$, $^{62}Ni$ and $^{64}Ni$.

7. A method according to claim 4, wherein the abrasive particle is diamond and the element is iron.

8. A method according to claim 7, wherein the isotopes of iron are selected from $^{54}Fe$, $^{56}Fe$, $^{57}Fe$ and $^{58}Fe$.

9. A method according to claim 1, wherein the catalyst/solvent is doped with the isotopes.

10. A method according to claim 9, wherein the isotopes are an element selected from boron, chromium, silicon, vanadium, magnesium, calcium, titanium and rare earth metals.

11. A method according to claim 1 wherein the abrasive particle is diamond and the isotopes introduced to the reaction vessel are gaseous.

12. A method according to claim 1 wherein the isotopes are introduced to the reaction vessel with the catalyst/solvent.

* * * * *